(12) United States Patent
Doshi et al.

(10) Patent No.: US 9,156,690 B2
(45) Date of Patent: Oct. 13, 2015

(54) HYDROGEN GENERATION PROCESS USING PARTIAL OXIDATION/STEAM REFORMING

(71) Applicant: HYDRADIX, INC., Des Plaines, IL (US)

(72) Inventors: Kishore J. Doshi, Fernandina Beach, FL (US); Bradley P. Russell, Wheaton, IL (US); Brandon S. Carpenter, Chicago, IL (US)

(73) Assignee: IFP ENERGIES NOUVELLES, Rueil-Malmaison Cedex (FR)

(*) Notice: Subject to any disclaimer, the term of this patent is extended or adjusted under 35 U.S.C. 154(b) by 0 days.

(21) Appl. No.: 13/864,975

(22) Filed: Apr. 17, 2013

(65) Prior Publication Data

US 2013/0230449 A1    Sep. 5, 2013

Related U.S. Application Data

(62) Division of application No. 11/597,578, filed as application No. PCT/US2005/018287 on May 25, 2005, now abandoned.

(51) Int. Cl.

| | |
|---|---|
| *C10J 3/46* | (2006.01) |
| *B01J 8/00* | (2006.01) |
| *B01J 7/00* | (2006.01) |
| *C01B 3/38* | (2006.01) |
| *B01J 8/02* | (2006.01) |
| *B01J 8/04* | (2006.01) |
| *C01B 3/50* | (2006.01) |
| *C01B 3/56* | (2006.01) |
| *C01B 3/36* | (2006.01) |

(52) U.S. Cl.
CPC ............ *C01B 3/386* (2013.01); *B01J 8/0278* (2013.01); *B01J 8/0453* (2013.01); *C01B 3/36* (2013.01); *C01B 3/382* (2013.01); *C01B 3/503* (2013.01); *C01B 3/505* (2013.01); *C01B 3/56* (2013.01); *B01J 2208/00176* (2013.01); *B01J 2208/00504* (2013.01); *B01J 2208/00628* (2013.01); *B01J 2219/00038* (2013.01); *C01B 2203/0244* (2013.01); *C01B 2203/043* (2013.01); *C01B 2203/0405* (2013.01); *C01B 2203/0455* (2013.01); *C01B 2203/0485* (2013.01); *C01B 2203/127* (2013.01); *C01B 2203/1258* (2013.01); *C01B 2203/1294* (2013.01); *C01B 2203/84* (2013.01)

(58) Field of Classification Search
USPC ................. 422/628, 629, 630, 600; 48/127.1, 48/197 R, 198.3
See application file for complete search history.

(56) References Cited

U.S. PATENT DOCUMENTS

| | | | |
|---|---|---|---|
| 3,972,731 A | | 8/1976 | Bloomfield et al. |
| 4,128,700 A | | 12/1978 | Sederquist |
| 5,360,679 A | | 11/1994 | Buswell et al. |
| 6,110,979 A | * | 8/2000 | Nataraj et al. ............... 518/704 |

(Continued)

FOREIGN PATENT DOCUMENTS

| | | |
|---|---|---|
| EP | 1 188 713 | 3/2002 |
| WO | WO 03 065488 | 8/2003 |

*Primary Examiner* — Kaity Handal
(74) *Attorney, Agent, or Firm* — Millen, White, Zelano & Branigan, P.C.

(57) ABSTRACT

Partial oxidation/steam reformers (222) which use heat integrated steam cycles and steam to carbon ratios of at least about 4:1 to enable efficient operation at high pressures suitable for hydrogen purification unit operation such as membrane separation (234) and pressure swing adsorption.

5 Claims, 10 Drawing Sheets

(56) References Cited

U.S. PATENT DOCUMENTS

| | | | |
|---|---|---|---|
| 6,114,400 A * | 9/2000 | Nataraj et al. | 518/715 |
| 6,147,126 A * | 11/2000 | DeGeorge et al. | 518/715 |
| 6,280,864 B1 | 8/2001 | Towler et al. | |
| 2002/0155061 A1 | 10/2002 | Prasad et al. | |
| 2003/0093950 A1 | 5/2003 | Goebel et al. | |
| 2003/0129108 A1 | 7/2003 | Burch et al. | |
| 2003/0190503 A1 | 10/2003 | Kumar et al. | |
| 2004/0020124 A1 | 2/2004 | Russell et al. | |
| 2004/0182002 A1 | 9/2004 | Malhotra et al. | |
| 2007/0212293 A1 * | 9/2007 | Porter et al. | 423/652 |

* cited by examiner

| Bed 1 | Adsorption | | | 1EP | Provide Purge | 2EP | BD | 1ER | Purge | | | 2ER | 1ER | Pressurize | | |
|---|---|---|---|---|---|---|---|---|---|---|---|---|---|---|---|---|
| Bed 2 | 1EP | Provide Purge | 2EP | BD | 1ER | Purge | | | Pressurize | | | Adsorption | | | | |
| Bed 3 | BD | Purge | 2ER | | Pressurize | | | Adsorption | | | 1EP | Provide Purge | 2EP | 1EP | Provide Purge | 2EP |
| Bed 4 | 1ER | Pressurize | | | Adsorption | | | 1EP | Provide Purge | 2EP | BD | Purge | | | 2ER |

FIGURE 7

HYDROGEN GENERATION PROCESS USING PARTIAL OXIDATION/STEAM REFORMING

FIELD OF THE INVENTION

This invention relates to processes for generating hydrogen involving the partial oxidation and reforming of fuel, especially to autothermal reforming processes. The hydrogen generators using the processes of this invention may find beneficial use in smaller-scale hydrogen plants.

BACKGROUND TO THE INVENTION

Hydrogen is used as a feedstock for many chemical processes and has been proposed as an alternative fuel especially for use in fuel cells in stationary and mobile facilities. Steam reforming of hydrocarbon-containing feedstock is a conventional source of hydrogen. Steam reforming of hydrocarbons is practiced in large-scale processes, often at a facility having refinery or chemical operations. Thus, for instance, the large-scale hydrogen plant will likely be able to draw upon the skills within the entire facility to operate sophisticated unit operations to enhance hydrogen production efficiency. An additional benefit of having a large scale hydrogen plant within a facility having refinery or chemical operations is that the steam generated in the hydrogen plant from cooling the steam reforming effluent and by heat exchange with the combustion of waste gases has value to such other refinery or chemical operations. The benefits of practicing steam reforming in large-scale plants are also apparent from the nature of the equipment and process. For instance, steam reforming generally uses very high temperatures, often in excess of 800° C., which in turn requires expensive materials of construction. Furthermore, large-scale hydrogen plants typically provide hydrogen product purity in excess of 99 volume percent with less than 10 parts per million by volume (ppmv) of carbon monoxide.

While the economics of large-scale steam reforming make attractive the shipping of hydrogen from such a large-scale reformer to the point of use, hydrogen, nevertheless, is difficult to store and distribute and has a low volumetric energy density compared to fuels such as gasoline. Thus an interest exists in developing economically and practically viable smaller-scale hydrogen generators to provide hydrogen from a hydrocarbon-containing feedstock for use or distribution at a point proximate to the consumer.

There are a number of practical hurdles for such a smaller-scale hydrogen generator to overcome before it is commercially viable beyond overcoming the loss of economy of scale. For instance, the smaller scale may not support sophisticated operating and technical staff and thus the hydrogen generator must be able to operate reliably with minimal operator support while still providing an economically acceptable hydrogen product meeting purity specifications. Often smaller-scale hydrogen generators face problems that do not occur with large-scale hydrogen plants. An example is that the hydrocarbon-containing feedstocks most often available to smaller-scale hydrogen generators are natural gas and LPG, both of which contain odorants (sulfur compounds) for safety reasons. As sulfur compounds can poison catalysts and may be unacceptable in the product hydrogen, smaller-scale hydrogen generators must incur the expense to remove them. Additionally, smaller-scale hydrogen generators may be stand alone units with no chemical or refinery operation to which steam can be exported.

Consideration has been given to the use of less efficient, but less capital intensive, alternative reforming technology such as partial oxidation/steam reforming, including autothermal reforming. But as a portion of the feed is oxidized in the reformer, efficiency penalties are taken that are not incurred by steam reforming. Accordingly, for partial oxidation/steam reforming to be competitive capital costs for the hydrogen generator must be low, the hydrogen product must meet purity requirements, and the amount of hydrogen produced per unit of hydrocarbon-containing feed must be adequately high.

Partial oxidation/steam reforming, including autothermal reforming, has been extensively studied. In general, studies have shown that the reforming reaction is an equilibrium reaction influenced by temperature and pressure. All other things being equal, lower pressures and higher temperatures favor the production of hydrogen, but higher temperatures necessitate more consumption of fuel, thus are disadvantageous. Similarly, higher ratios of steam to hydrocarbon-containing feedstock favor the production of hydrogen, but the vaporization of water requires heat. Hence, most often partial oxidation reformers use no more than about 3 moles of steam per carbon in the hydrocarbon-containing feedstock.

The reformate from partial oxidation/steam reforming will contain carbon monoxide, carbon dioxide, hydrogen, unreacted hydrocarbon-containing compounds and nitrogen and argon (with air being used as the source of the oxygen-containing gas for the partial oxidation) as well as water. To enhance the efficiency of partial oxidation/steam reforming, the use of water gas shift to convert carbon monoxide and water to carbon dioxide and hydrogen is often used. Processes that have been proposed to remove the remaining carbon monoxide include selective oxidation and methanation.

Membrane and pressure swing adsorption separations can be effective for purifying the hydrogen product since they can remove nitrogen, argon, carbon dioxide, carbon monoxide and unreacted hydrocarbon-containing compounds. However, membrane and pressure swing adsorption systems typically require the gases fed to them to be at elevated pressure. Large-scale steam reformers can tolerate the use of reforming temperatures that are suitable to provide a reformate at pressures suitable for such separations. However such is not the case with smaller-scale partial oxidation/steam reforming units where it is desirable to operate at lower temperatures in order to avoid expensive metallurgy and reduce capital costs. And it is not the case for stand alone hydrogen generators where opportunities to export steam do not exist. Because of the adverse effect of pressure on the efficiency of hydrogen production in these partial oxidation/steam reforming processes, reforming would typically occur at lower pressures, and then the reformate would be compressed to the required pressures. However, additional operating and capital costs are entailed in employing such a compressor. Moreover, membrane and pressure swing adsorption systems can be particularly disadvantages for a smaller-scale hydrogen generator due to loss of hydrogen. The retentate, in the case of membranes, and the purge gas, in the case of pressure swing adsorption, contain unrecovered hydrogen and thus reduce the net hydrogen efficiency (NHE) (heating value of purified hydrogen recovered per unit heating value of hydrocarbon-containing feedstock to the generator). This reduction in net hydrogen efficiency can be deleterious to achieving an economically-competitive smaller-scale hydrogen generator.

Accordingly, processes are sought that yield a hydrogen product of suitable quality, including a very low carbon monoxide concentration; provide favorable economics as compared to shipping and storage of hydrogen produced by a large-scale hydrogen plant; are easily operated with minimal needs for technical sophistication and maintenance.

SUMMARY OF THE INVENTION

In accordance with the processes of this invention, attractive economics of hydrogen production can be achieved in smaller-scale hydrogen generators using partial oxidation/steam reforming while still enabling the use of membrane or pressure swing adsorption unit operations to achieve acceptable hydrogen product purity. The processes of this invention effect the partial oxidation/steam reforming at high pressures, e.g., at least about 400, preferably at least about 500, kPa absolute, but without the expected undue reduction in net hydrogen efficiency. The processes of this invention have conversion efficiencies (Net Hydrogen Efficiencies or NHE) of at least about 50 percent, preferably at least about 55 percent, without a water gas shift. With a water gas shift, net hydrogen efficiencies of at least about 55, and often in excess of 60, percent may be achieved. The Net Hydrogen Efficiency is the ratio of lower heating values of the recovered hydrogen product stream to the lower heating value of the hydrocarbon feed stream:

$$NHE = \frac{P \times LHV_P}{F \times LHV_F} \times 100$$

where
P=molar flow of net hydrogen product (mol/hr)
$LHV_P$=lower heating value of product hydrogen (kJ/mol)
F=molar flow of hydrocarbon feedstock (mol/hr)
$LHV_F$=lower heating value of hydrocarbon feedstock (kJ/mol).

The term "partial oxidation/steam reforming" as used herein intended to encompass a catalytic reforming processes in which a portion of the hydrocarbon-containing feedstock supplied to the reformer is oxidized in-situ to produce heat for the endothermic reforming process and a portion of the hydrocarbon-containing feedstock is reacted, or reformed, with steam to provide a reforming effluent, or reformate.

In accordance with the processes of this invention, an undue adverse effect from high pressure reforming is avoided by the use of a heat integrated steam cycle employing a ratio of steam to carbon in the hydrocarbon-containing feedstock above about 4:1. While these higher steam to carbon ratios are expected to favor the production of hydrogen in the partial oxidation/steam reforming, the adverse effect of pressure and of energy consumption required to vaporize the higher amounts of steam are reduced by using a heat integrated steam cycle. The heat integrated steam cycle takes advantage of the increased mass of effluent from the partial oxidation reformer to generate at least about 40, and preferably at least about 50, percent of the steam for supply to the reformer at a high temperature, e.g., at least about 300° C. or 350° C., preferably at least about 400° C., say 450° to 600° C.

In preferred aspects of the invention, the heat integrated steam cycle takes advantage of waste gas from hydrogen purification operations such as membrane separations and pressure swing adsorptions. The waste gas is combusted to generate, in combination with the steam generated by cooling the effluent from the reformer, at least about 90 percent of the steam supplied to the reformer. The heat from the combustion is also used to heat at least a portion of the feed to the partial oxidation reformer. In these preferred aspects, steam and heat are obtained from the unrecovered hydrogen instead of consuming additional hydrocarbon-containing feedstock.

In one preferred embodiment, hydrogen is generated by an autothermal reforming process at a pressure of at least about 400 kPa absolute which comprises supplying as feed to a partial oxidation/steam reforming zone hydrocarbon-containing feedstock, air and steam, wherein free oxygen is provided in a mole ratio to carbon in the feedstock of between about 0.4:1 to 0.6:1 and steam is provided in a mole ratio to carbon in the feedstock in an amount of at least about 4:1; maintaining said zone under partial oxidation/steam reforming conditions including said pressure to partially oxidize a portion of the feedstock to generate heat and to reform a portion of said feedstock to generate hydrogen whereby a reforming effluent stream comprising hydrogen, carbon monoxide and carbon dioxide is provided; and cooling the reforming effluent stream by indirect heat exchange with a stream containing liquid water to provide a steam-containing stream at a temperature of at least about 300° C. which is cycled to the partial oxidation/steam reforming zone wherein at least about 40 percent of the steam in the feed mixture is produced by said indirect heat exchange and separating a sufficient portion of the reformats and combusting said portion to provide a hot combustion gas to (i) heat at least a portion of the feed by indirect heat exchange with the hot combustion gas to provide an average temperature of the feed to the partial oxidation/steam reforming zone of at least about 450° C. and to provide a cooler combustion gas and (ii) generate the remaining steam to provide said steam to carbon ratio by indirect heat exchange with the cooler combustion gas.

In preferred embodiments, the reforming pressure is sufficient that, especially at reforming temperatures of between about 640° C. and 730° C., the reforming effluent contains less than about 5, preferably less than about 4, mole percent carbon monoxide (dry basis). Preferably the mole ratio of carbon monoxide to molecular hydrogen in the reforming effluent is less than about 0.085:1, often between about 0.03:1 to 0.085:1.

In further detail, in the broad aspect of this invention hydrogen is generated at a pressure of at least about 400, preferably at least about 500 up to about 1500, kPa absolute using an heat integrated steam cycle. The process comprises:

supplying as feed to a partial oxidation/steam reforming zone hydrocarbon-containing feedstock, air and steam, wherein free oxygen is provided in a mole ratio to carbon in the feedstock of between about 0.4:1 to 0.6:1 and steam is provided in a mole ratio to carbon in the feedstock in an amount of at least about 4:1, preferably about 4.5:1 to 8:1, and most preferably about 4.5:1 to 6.5:1;

maintaining said zone under partial oxidation/steam reforming conditions including said pressure to partially oxidize a portion of the feedstock to generate heat and to reform a portion of said feedstock to generate hydrogen whereby a reforming effluent stream comprising hydrogen, carbon monoxide and carbon dioxide is provided; and cooling the reforming effluent stream by indirect heat exchange with a stream containing liquid water to provide a steam-containing stream at a temperature of at least about 300° C. or 350° C., preferably at least about 400° C., say 450° to 600° C., which is cycled to the partial oxidation/steam reforming zone wherein at least about 40, preferably at least about 50, percent of the steam in the feed mixture is produced by said indirect heat exchange.

Preferably, the reforming effluent is subjected to at least one subsequent unit operation to separate nitrogen and carbon oxides from the hydrogen and provide a purified hydrogen product. Such subsequent unit operations include, but are not limited to, membrane separation or pressure swing adsorption.

In another preferred embodiment of the invention, the reforming effluent is cooled in at least two indirect heat exchanger stages, each with a feed containing liquid water. By having the vaporization occur in each indirect heat exchanger section, several advantages are obtained. For instance, the heat exchanger surface area can be more effectively used to recover large amounts of steam. The reforming effluent can be rapidly cooled, and the amount of steam being produced can be easily and quickly varied to accommodate changes in production rate. Where a water gas shift is used, heat exchanger stages may straddle the shift reactor and heat generated by the exothermic shift reaction would thus also be recovered as steam for cycling to the reformer.

In other preferred processes of this invention, hydrogen is generated from a hydrocarbon-containing feedstock in the essential absence of a shift reaction zone by:
  a. passing to a partial oxidation reformer at a pressure of between about 400 and 1500 kPa absolute feed comprising hydrocarbon-containing feedstock, air, and steam wherein the molar ratio of steam to carbon in the hydrocarbon-containing feedstock is at least about 4:1, said reformer being at partial oxidation/steam reforming conditions to provide a reforming effluent stream comprising at least about 40 volume percent (dry basis) hydrogen, nitrogen, steam, carbon monoxide and carbon dioxide;
  b. cooling the reforming effluent stream by indirect heat exchange with a stream containing liquid water to provide a steam-containing stream at a temperature of at least about 300° C. which is cycled to the partial oxidation/steam reforming zone wherein at least about 40 percent of the steam in the feed mixture is produced by said indirect heat exchange;
  c. further cooling the cooled reforming effluent stream to pressure swing adsorption conditions, said cooling being sufficient to condense water;
  d. during or after the further cooling, separating the condensed water;
  e. subjecting the further cooled reforming effluent stream to pressure swing adsorption such that a purified hydrogen stream is produced which (i) is at least about 98, preferably at least about 99, mole percent hydrogen, and (ii) contains less than about 10, preferably less than about 5, ppmv carbon monoxide, and a sorption purge gas is produced at a pressure between about 5 and 100 kPa gauge which comprises less than about 30, and sometimes less than about 25, volume percent hydrogen (dry basis) and nitrogen, carbon dioxide and carbon monoxide;
  f. withdrawing at least a portion of the purified hydrogen stream as hydrogen product;
  g. combusting in the substantial absence of added fuel, the sorption purge gas with an oxygen-containing gas in the presence of an oxidation catalyst to provide a combustion gas having a temperature of less than about 800° C., preferably less than about 750° C.;
  h. subjecting the combustion gas to at least one indirect heat exchange with a water-containing stream to generate steam which is cycled to the reformer; and
  i. exhausting the cooled combustion gas,
wherein the Net Hydrogen Efficiency is at least about 50 percent.

Preferably, the pressure swing absorption comprises four absorbent beds and two pressure equalizations. Often the purified hydrogen product comprises at least about 99.9 Volume percent hydrogen.

Another alternative aspect of the processes of this invention pertains to accommodating hydrocarbon-containing feedstocks that also contain sulfur compounds. While available catalysts used for partial oxidation/steam reforming have ample sulfur tolerance, water gas shift catalysts tend to be highly sensitive to sulfur components. The processes of this invention where no water gas shift is used since the reforming effluent has a lower carbon monoxide content gives the designer of the hydrogen generator the ability to remove sulfur compounds at virtually any stage of the process. Removal of sulfur components subsequent to reforming does have advantages. For instance, the reforming converts essentially all species of sulfur components typically encountered such as organosulfides, mercaptans and carbonyl sulfide to hydrogen sulfide. Thus, the sulfur removal process need only address hydrogen sulfide removal to reduce the sulfur components to acceptable concentrations. Chemisorbents such as zinc oxide are effective for hydrogen sulfide removal, but typically in the presence of steam temperatures below about 250° C., often between about 40° and 200° C., are desired for the chemisorption. In one aspect of the invention no water gas shift catalyst is employed. Without a sulfur sensitive water gas shift catalyst, the reformate may be cooled to temperatures suitable for hydrogen sulfide sorption with the hydrogen sulfide being removed prior to or after hydrogen purification by separation.

In these processes hydrocarbon-containing feedstock, which also contains sulfur compound, air and steam are subjected to reforming conditions whereby a reforming effluent comprising hydrogen, carbon monoxide, carbon dioxide and hydrogen sulfide is provided, wherein the reforming conditions comprise:
  a. a pressure greater than about 400 kPa absolute, and
  b. a mole ratio of steam to carbon in the feedstock of at least about 4:1; and cooling the reforming effluent stream to a temperature suitable for hydrogen sulfide sorption said cooling comprising indirect heat exchange with water to generate at least a portion of the steam for the feed to the reformer, and contacting the cooled reforming effluent stream with a hydrogen sulfide sorbent to provide a stream having a reduced hydrogen sulfide concentration. In more preferred embodiments of this aspect of the invention, the hydrocarbon-containing feedstock contains organosulfides and at least one of carbonyl sulfide and hydrogen sulfide and is contacted with a sorbent for organosulfides prior to reforming to provide a hydrocarbon-containing feedstock comprising at least one of hydrogen sulfide and carbonyl sulfide.

This invention also pertains to apparatus adapted to use the heat integrated steam cycle. The hydrogen generator comprises:
  a) a partial oxidation reformer containing partial oxidation and reforming catalysts and adapted to provide a hydrogen-containing reformate, said reformer having an inlet section and an outlet section,
  b) a hydrocarbon-containing feed supply line in fluid communication with the inlet section of the partial oxidation reformer,
  c) an oxygen-containing feed supply line in fluid communication with the inlet section of the partial oxidation reformer,
  d) an indirect heat exchanger in fluid communication with the outlet section of the partial oxidation reformer said heat exchanger having a hot side through which the hydrogen-containing reformate passes and a cool side in fluid communication with at least a liquid water supply, said heat exchanger adapted to provide a steam-containing stream, e) a steam line adapted to direct the steam-containing stream from the heat exchanger to the inlet section of the partial oxidation reformer, f) a cooler adapted to receive cooled reformate from the hot side of the heat exchanger and provide a further cooled reformate and condensed water, g) means to remove condensed water from the further cooled reformate, h) a pressure swing adsorber adapted to receive the further cooled reformate from the cooler, which reformate has had condensed water removed, and provide a hydrogen product stream and a purge stream containing hydrogen, i) a combustor containing oxidation catalyst adapted to receive said purge stream and an oxygen-containing gas and provide a combustion gas, and j) at least one indirect heat exchanger having a hot side adapted to receive said combustion gas and a cold side in fluid communication with a liquid water line adapted to provide steam, said heat exchanger being in fluid communication with the partial oxidation reformer.

Preferably the oxidation catalyst in the combustor is adapted to serve as a flame holder. Advantageously, the apparatus comprises at least one indirect heat exchanger having a hot side adapted to receive the combustion gas from the combustor and a cold side in fluid communication with at least one of the hydrocarbon-containing feedstock supply line, the oxygen-containing feed supply line and the steam line. Most advantageously the pressure swing adsorber has four adsorbent beds.

BRIEF DESCRIPTION OF THE DRAWINGS

FIG. 7 is a cycle diagram for a four bed pressure swing adsorber useful in this invention.

DETAILED DESCRIPTION

Feed Components

Figure 1:
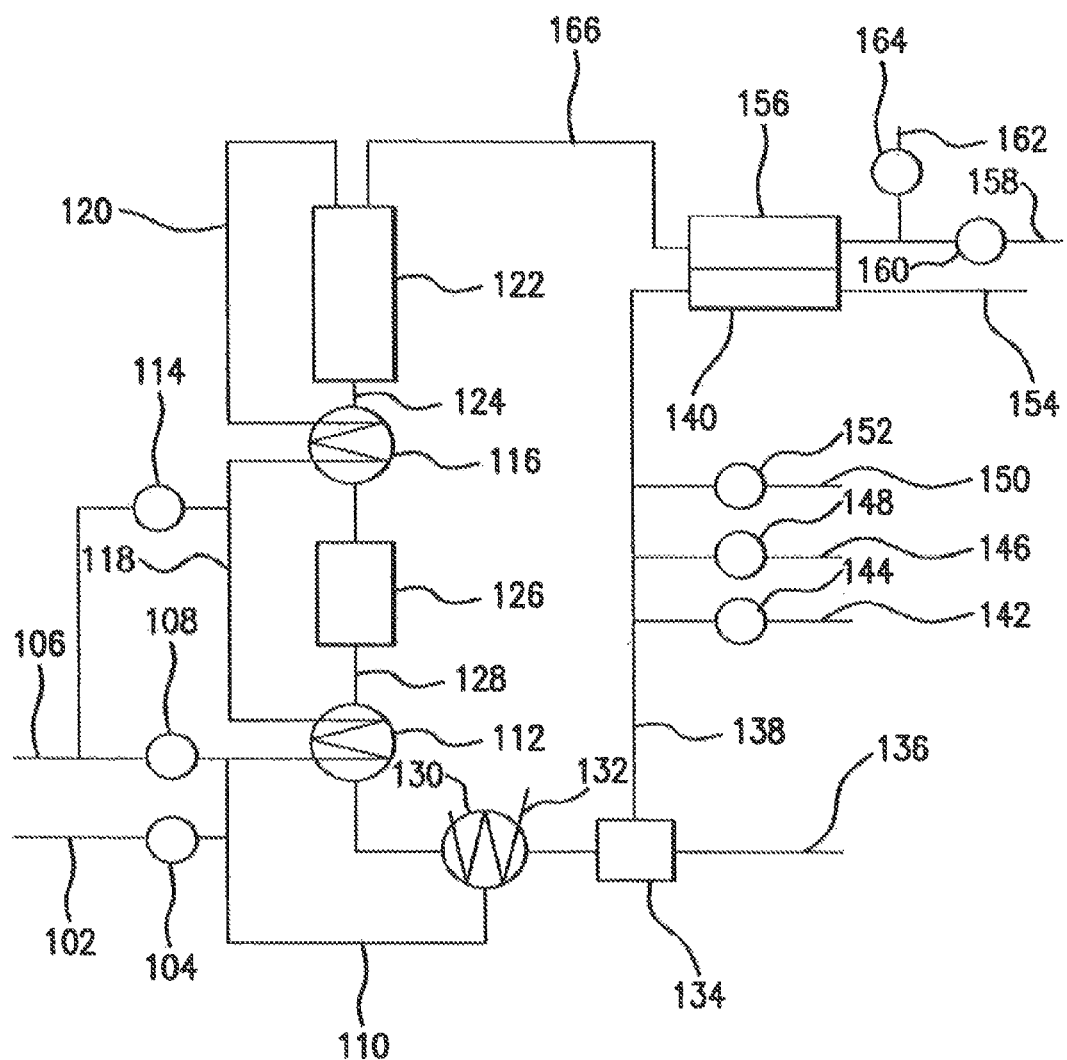
FIG. 1 is schematic flow diagram of a process in accordance with this invention in which the partial oxidation reformer effluent is subjected to water gas shift conditions and is purified through pressure swing adsorption.

The hydrocarbon-containing feeds used in accordance with the invention are typically gaseous under the conditions of reforming. Lower hydrocarbon gases such as methane, ethane, propane, butane and the like may be used. Because of availability, natural gas and liquid petroleum gas (LPG) are most often used as feeds. Oxygenated hydrocarbon-containing feeds such as methanol and ethanol are included as hydrocarbon-containing feeds for all purposes herein.

Natural gas and liquid petroleum gas typically contain odorants such that leaks can be detected. Odorants conventionally used are one or more organosulfur compounds such as organosulfides, e.g., dimethyl sulfide, diethyl sulfide, and methyl ethyl sulfide; mercaptans, e.g., methyl mercaptan, ethyl mercaptan, and t-butyl mercaptan; thiophenes of which tetrahydrothiophene is the most common; and the like. The amount used can vary widely. For natural gas, the organosulfur component is often in the range of about 1 to 20 parts per million by volume (ppmv); and for LPG a greater amount of sulfur compounds are typically used, e.g., from about 10 to 200 ppmv. It is not unusual for commercially obtained hydrocarbon feeds to contain also other sulfur compounds that may be natural impurities such as hydrogen sulfide and carbonyl sulfide. Carbonyl sulfide concentrations in natural gas and LPG of 0.1 to 5 ppmv are not unusual.

Regardless of the form, sulfur compounds are generally undesirable in the product hydrogen and can be deleterious to catalysts used in hydrogen generators such as water gas shift catalysts. The processes of this invention provide flexibilities in where sulfur is removed. If desired, the hydrocarbon-containing feed can be desulfurized. Any convenient desulfurization technique may be used including sorption and hydrodesulfurization. In an aspect of this invention the desulfurization occurs subsequent to reforming. In the reforming process, substantially all the sulfur components are converted to hydrogen sulfide. Hydrogen sulfide can then be removed from the reformate by sorption. If desired a guard bed can be used upstream of the reformer containing transition metal exchanged molecular sieve such as zinc or copper exchanged zeolite X or zeolite Y to assist in the removal of sulfur compounds, especially thiophenes such as tetrahydrothiophene.

The hydrocarbon-containing feeds can contain other impurities such as carbon dioxide, nitrogen and water. In the processes of this invention, it is preferred that the concentration of carbon dioxide be less than about 5, preferably less than about 2, volume percent (dry basis).

Water in addition to that contained in the other feed components to the process is used to achieve the high steam to carbon ratios of the feed to the partial oxidation reformer. Due to the large quantities of water contained in the feed to and the reformate from the reformer, recycling of water is usually effected. The water is preferably deionized water.

Air is typically used as the source of the oxygen for the partial oxidation/steam reforming. The term "air" as used herein is intended to include air or oxygen-enriched air, i.e., up to about 30 volume percent oxygen.

The feed components to the reformer are admixed prior to contact with the catalyst in the partial oxidation reformer. Due to combustion risks, the hydrocarbon-containing fuel and air are typically not admixed until immediately prior to contacting the catalyst. Steam may be in admixture with one or both of the hydrocarbon-containing feedstock and the oxygen-containing feed prior to entry into the reformer. In preferred aspects of the invention liquid water is admixed with another feed, preferably the hydrocarbon-containing feed, and is vaporized. Thus, the load on compressors to bring the feeds to the reforming conditions is reduced.

The hydrocarbon-containing feedstock and the air may be heated prior to being introduced into the partial oxidation reformer. The water is preferably introduced into the reformer as superheated steam. Generally, the temperature of the steam, which may be in admixture with the hydrocarbon-containing feedstock or the air, is at least about 300° C., and often between about 400° C. and 700° C., preferably between about 450° C. and 650° C. In the preferred aspects of the invention, air is heated prior to being introduced into the partial oxidation reformer. When the hydrocarbon-containing feedstock is heated, especially to temperatures above about 400° C., it is heated in the presence of steam or liquid water, which is vaporized to provide steam. Often the ratio of steam to carbon for this heating is at least about 1:1.

The mole ratio of total water (i.e., the water contained in all of the hydrocarbon-containing feed mixture with steam, the water in mixture with air and that separately introduced) to carbon in the hydrocarbon-containing feed (steam to carbon ratio) is at least about 4:1, preferably between about 4.5:1 to 8:1. The mole ratio of free oxygen to carbon in the hydrocarbon-containing feed is generally within the range of about 0.4:1 to 0.6:1.

Process Conditions

The partial oxidation/steam reforming is catalytic. The overall partial oxidation and steam reforming reactions for methane are expressed by the formulae:

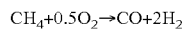

$$CH_4 + 0.5 O_2 \rightarrow CO + 2H_2$$

$$CH_4 + H_2O \leftrightarrow CO + 3H_2$$

The reformer may comprise two or more discrete sections, e.g., a first contact layer of oxidation catalyst followed by a second layer of steam reforming catalyst, or may be bifunctional, i.e., oxidation catalyst and steam reforming catalyst are intermixed in a single catalyst bed or are placed on a common support. The partial oxidation reformate comprises hydrogen, nitrogen, argon, carbon oxides (carbon monoxide and carbon dioxide), steam and some unconverted hydrocarbons.

Partial oxidation/steam reforming conditions typically comprise a temperature (measured at the catalyst outlet) of at least about 600° C. up to about 800° C., and is preferably between about 640° and 730° C. In the broad aspects, partial oxidation/steam reforming includes reforming processes where supplemental external combustion of a fuel, e.g., hydrocarbon-containing feedstock or hydrogen-containing stream such as an anode waste gas from a fuel cell, is used to provide heat for reforming by indirect heat exchange. As between the in situ partial oxidation and the supplemental external combustion for indirect heat exchange, the partial oxidation preferably generates at least 70 percent, and preferably substantially all, of the heat (excluding the heat carried with the feed to the reformer from heat exchange with the reformate or from the combustion of unrecovered hydrogen such as contained in the purge gas from a pressure swing adsorber, the retentate from a membrane separation and anode waste gas if the hydrogen product is used as a feed to a fuel cell), i.e., an autothermal reforming process.

The pressure in the reforming conditions of the processes of this invention is at least about 400 kPa, say from about 500 kPa to 1500 or 2500 kPa, preferably from about 500 kPa to about 1200 kPa, absolute. When the reformer effluent is subjected to a hydrogen purification operation that depends upon a differential in pressure such as pressure swing adsorption and membrane separation, advantageously the partial oxidation/steam reforming conditions comprise a pressure suitable for the operation without an intervening compression.

Figure 9A:
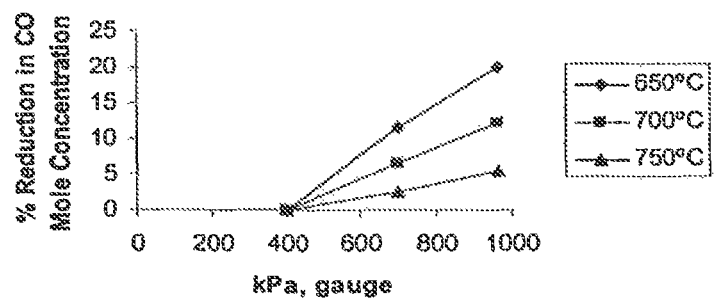
FIGS. 9A, 9B and 9C are depictions of computer simulations of the effect of pressure on carbon monoxide production in a partial oxidation/steam reforming process at reforming temperatures of 650°, 700° and 750° C. for hydrocarbon-containing feedstocks having steam to carbon ratios of 4:1, 6:1 and 8:1, respectively. The figures graphically depict the percentage that the carbon monoxide mole concentration (dry basis) is reduced by increasing pressure above 414 kPa gauge.
Figure 9B:
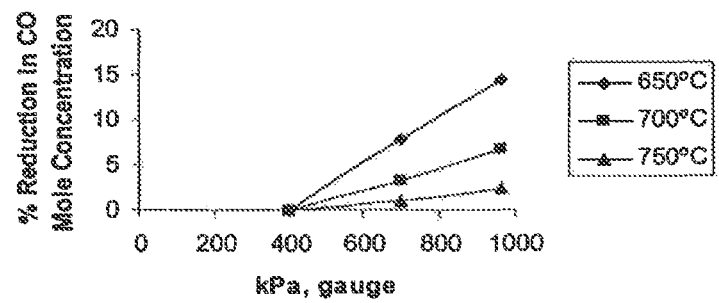
Figure 9C:
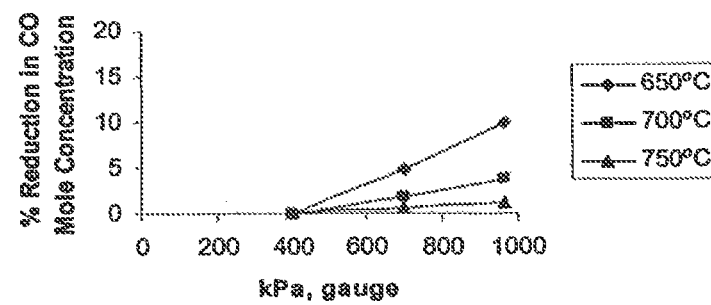

FIGS. 9A, 9B and 9C illustrate from a computer simulation the effect important role that temperature plays in enabling pressure to influence the carbon monoxide concentration. As can be seen from the graphic depictions, if the temperature is too high, e.g., 750° C., pressure has a significantly attenuated effect in reducing carbon monoxide concentration. At partial oxidation/steam reforming temperatures within the scope of this invention, i.e., below about 730° C., pressure has a more pronounced ability to reduce carbon monoxide concentration in the reformate.

On a dry basis, the components of the effluent from the reformer fall within the ranges set forth below:

Reformer Effluent Components, Dry Basis

| Component | Mole Percent, Dry Basis, Partial oxidation/steam reforming |
|---|---|
| Hydrogen | 35 to 55, frequently 40 to 50 |
| Nitrogen | 25 to 45, frequently 30 to 40 |
| Carbon monoxide | 1 to 5, frequently 2 to 4 |
| Carbon dioxide | 10 to 20, frequently 12 to 15 |

A purified hydrogen product is obtained from the reformate through one or more unit operations.

A water gas shift is the most commonly used catalytic process for converting carbon monoxide into carbon dioxide and more hydrogen. Generally, the shift reactor contains at least one water gas shift reaction zone. In the shift reactor carbon monoxide is exothermically reacted in the presence of a shift catalyst in the presence of an excess amount of steam to produce additional amounts of carbon dioxide and hydrogen.

The shift reaction is an equilibrium reaction, and lower carbon monoxide concentrations are favored at lower temperatures. Thus conventionally a plurality of shift stages are used from high temperature, e.g., in excess of 350° or 400° C., to lower temperature, e.g., below about 250° C. The heat integrated steam cycle of this invention can eliminate the necessity of having a water gas shift in order to achieve acceptable net hydrogen efficiencies, thus saving in capital costs and operating complexities. If a water gas shift is desired to obtain even higher net hydrogen efficiencies, the heat integrated steam cycle enables most of the benefit to be obtained using only a water gas shift at moderate, or medium, temperature shift conditions, e.g., between about 250° C. and about 400° C. If a water gas shift is used, the Net Hydrogen Efficiency is often at least about 55, and sometimes above 60, percent.

Other catalytic processes for reducing carbon monoxide in the reformate include selective oxidation. While in the broad aspects selective oxidation can be used, it is generally less preferred not only because of the addition of equipment and operating complexities, but also, the selective oxidation can consume some of the hydrogen.

For many applications, the hydrogen product from the reforming has to have a high hydrogen concentration, e.g., 98 volume percent hydrogen or better. Thus, not only must carbon monoxide be removed, but also other components contained in the reformate such as carbon dioxide, nitrogen and water. The high pressure reformate of this invention makes feasible hydrogen purification by membrane or pressure swing adsorption.

Any suitable membrane and membrane configuration may be used for separation of hydrogen as a permeate. Typical membranes include polymeric membranes operable with feed temperatures of between about ambient and 150° C. and metallic membranes, e.g., platinum or palladium, at feed temperatures of up to 500° C. The pressure on the permeate side of the membrane is often less than about 200 kPa absolute.

Pressure swing adsorption is a preferred unit operation for purifying the reformate. Desirably the pressure swing adsorption provides a hydrogen product stream of at least about 98, preferably at least 99, or 99.5, volume percent hydrogen and contains less than about 10 or 20, preferably less than about 5, ppmv of carbon monoxide. Usually the pressure swing adsorption recovers at least about 60, preferably at least about 70, percent of the hydrogen contained in the stream fed to the pressure swing adsorption.

Any suitable adsorbent or combination of adsorbents may be used for the pressure swing adsorption. The particular adsorbents and combinations of adsorbents used will, in part, depend upon the components of the feed to the pressure swing adsorber, the sought compositions in the purified hydrogen product and the geometry and type of pressure swing adsorber used. Adsorbents include molecular sieves including zeolites, activated carbon activated alumina and silica gel. Particularly advantageous sorbents include a combination of sorbents with the first portion of the bed being composed of activated carbon which is particularly effective for water, methane and carbon dioxide removal followed by one or more molecular sieves such as NaY, 5A, 13X, lithium or barium exchanged X, silicalite and ZSM-5. The sorbents may be of any suitable particle size given the constraints of pressure drop and bed lifting for an up-flow fixed bed.

The pressure swing adsorber may be of any suitable design including rotary and multiple bed. The purging of the bed may be by vacuum, but most conveniently for simplicity, the purge is above ambient atmospheric pressure. A preferred pressure swing adsorption system for low maintenance operation uses at least four fixed beds. By sequencing the beds through adsorption and regeneration steps, a continuous flow of purified hydrogen stream can be achieved without undue loss of hydrogen. With at least four beds, one bed at a given time will be adsorbing, while other beds will be undergoing regeneration or pressure equalization steps. Preferably, at least one, and more preferably two or three, pressure equalization steps are used to increase hydrogen recovery.

FIG. 7 is a cycle chart for a four bed pressure swing adsorption system operated with two pressure equalizations. Bed 1 is first in an adsorption step where cooled reformate is fed to the bed and purified hydrogen product is obtained. In the next cycle step for Bed 1, the pressure in the bed is decreased, and the released gas, which is rich in hydrogen, is used to increase the pressure in Bed 3. This is the first pressure equalization (1E) and Bed 1 is providing the pressure (1EP) and Bed 3 is receiving (1ER). Then the pressure in Bed 1 is further decreased with the off gases being used to purge Bed 2 with the off gases being the sorption purge gas. A second pressure equalization (2E) then occurs between Bed 1 (2EP) and Bed 2 (2ER). In the next step, the pressure in Bed 1 is released, usually to slightly above ambient, in a countercurrent blowdown (BD) operation. The gas from the blowdown may be combusted in a waste stream combustor. Then Bed 1 is subjected to a countercurrent purge using provide purge from Bed 4 to produce a sorption purge gas. At the conclusion of the purge, the pressure in Bed 1 is increased via the second pressure equalization with Bed 4. In the final sequence, the pressure in Bed 1 is increased by the first pressure equalization from Bed 3 and lastly by counter current repressurization with purified hydrogen product. Each of the beds proceeds through the same sequence of cycle steps.

FIG. 7 is illustrative of a cycle diagram for a four bed pressure swing adsorption system. The use of more beds is well within the skill of the art in pressure swing adsorption design. The cycle times are selected to provide the hydrogen product of a desired purity. The cycle times may be adjusted with changes in throughput to maintain constant purity or may be constant with the purity changing with changes in throughput. As another modification, purified hydrogen product may also be introduced during the 1E step.

Figure 8B:
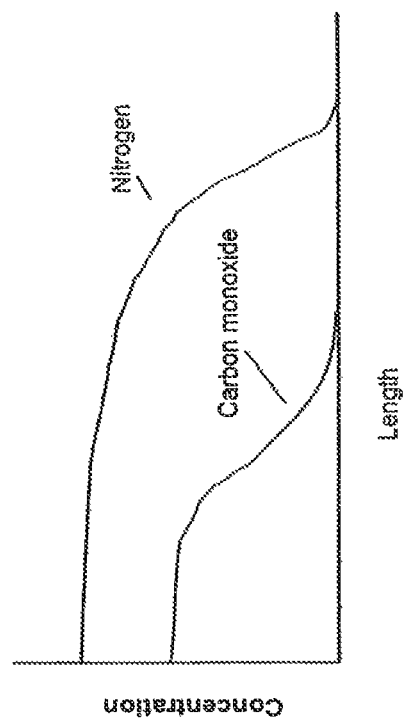
FIG. 8B is a graphic depiction of regeneration of the adsorption bed shown in FIG. 8A.
Figure 8A:
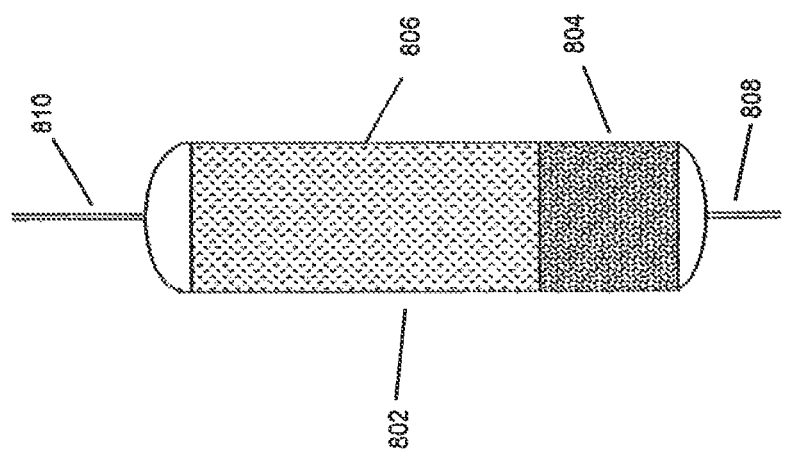
FIG. 8A is a schematic diagram of an adsorption bed useful for pressure swing adsorption in the process of this invention.

As the reformate contains nitrogen, the ability to provide a purified hydrogen product having very low carbon monoxide content, is facilitated. See, for instance, FIG. 8A. Vessel 802 has inlet 808 and outlet 810 and contains activated carbon as the leading portion of the bed 804. In that section of the bed, the water, carbon dioxide and unreacted hydrocarbon-containing feedstock, e.g., methane, are effectively adsorbed. The next section of the bed 806 comprises lithium X molecular sieve, which is more selective for the adsorption of carbon monoxide than nitrogen. Thus, regeneration will be based upon nitrogen breakthrough. As can be seen from FIG. 8B, the carbon monoxide adsorption front will still be far from breakthrough when the bed requires regeneration. Argon is also present in air and can be removed with the nitrogen via the pressure swing adsorption.

Heat Integrated Steam Cycle

The processes of this invention use a heat integrated steam cycle to enable attractive operation at high reforming pressures. The integrated steam cycle accommodates and uses to advantage the high steam to carbon ratios fed to the partial oxidation reformer and enables attractive Net Hydrogen Efficiencies to be obtained.

In a fundamental aspect of the integrated steam cycle, the hot reformate is used to generate a significant portion of the steam fed to the reformer and provides some superheating to the steam. In more preferred aspects, a stream is separated from the reformate and combusted to provide additional heat for the reforming. This heat is preferably used to provide by an indirect heat exchange, an average feed temperature of the feed to the reformer of at least about 450° C., and more preferably, at least about 500° C., say, 500° C. to 650° C. The cooled combustion gas is then used to generate additional steam, and preferably all the remaining steam, for the feed to the reformer. The separation may be a side stream of some of the reformate, or may be the purge gas or retentate form a pressure swing adsorption or membrane separation unit operation used to provide a purified hydrogen product.

Figure 10:
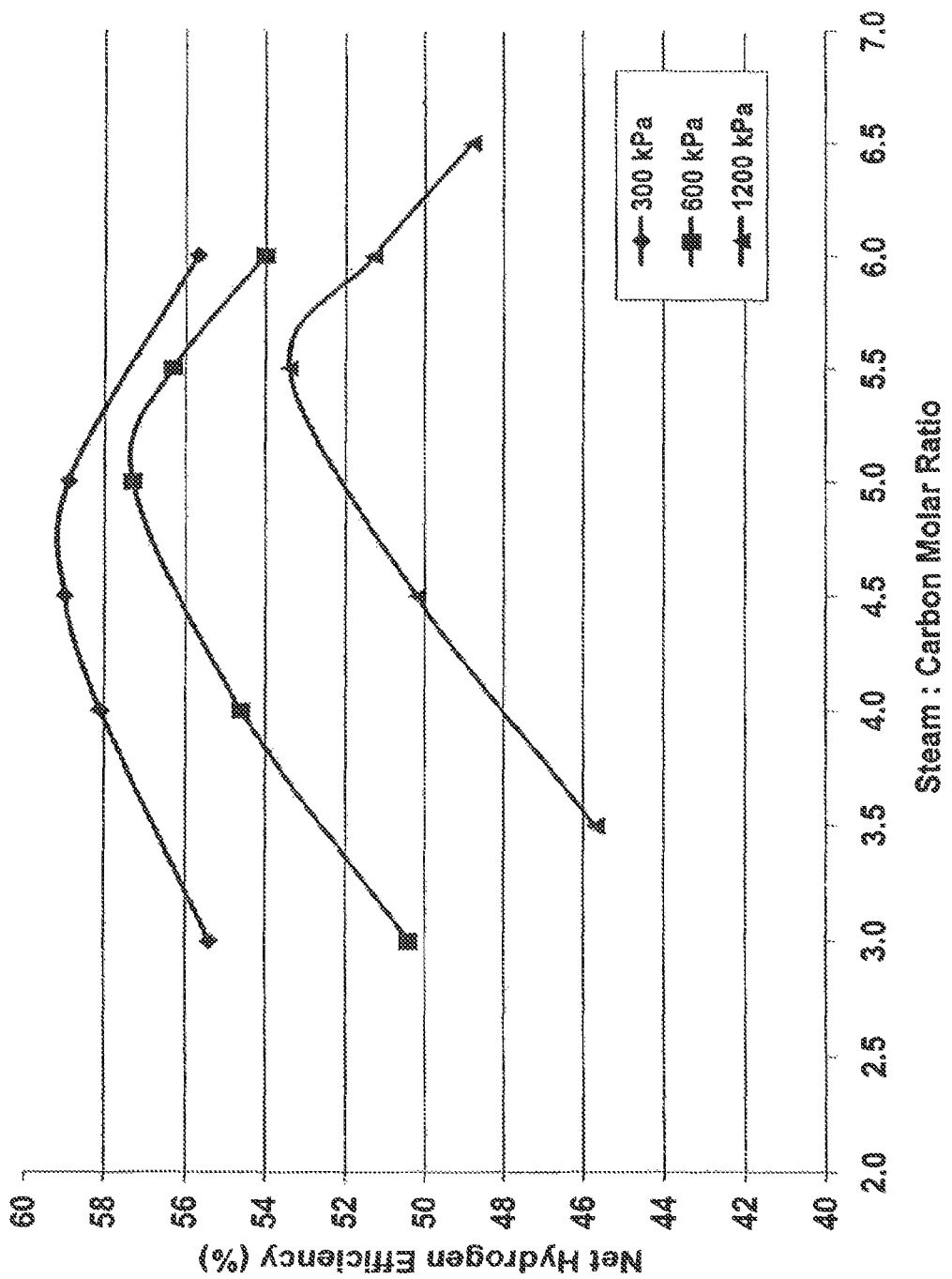
FIG. 10 depicts in graphic form the results of a computer simulation showing the enhancement in net hydrogen efficiency of generators operating at pressures of 300, 600 and 1200 kPa absolute that can be achieved through the use of steam to carbon ratios greater than 4:1.

As shown in FIG. 10, at higher reforming pressures, the use of an integrated steam cycle can enhance the Net Hydrogen Efficiency. FIG. 10 is described in further detail later in this specification. With reference to FIG. 10, at a steam to carbon ratio of 3.0:1, the increase in reforming pressure from 300 to 600 kPa absolute results in a decrease in Net Hydrogen Efficiency from 55.4 percent to about 50.3 percent. But at higher steam to carbon ratios, the gap narrows. At a steam to carbon ratio of 5.0:1, the gap is only about 1.6 Net Hydrogen Efficiency percentage points, a decrease of nearly 70 percent. Similarly, an increase in pressure from 300 to 1200 kPa at a lower steam to carbon ratio, e.g., 3.5:1, causes a loss of about 10 Net Hydrogen Efficiency percentage points. If, however, the steam to carbon ratio is increased to about 5.5:1, not only does the gap narrow to about 4 Net Hydrogen Efficiency percentage points, but also, the increase in steam to carbon ration is actually adversely affecting the Net Hydrogen Efficiency of the lower pressure operation.

In the processes of this invention, at least about 40, say, about 50 to 60 or even 75, percent of the steam supplied to the partial oxidation reformer is generated by cooling the reforming effluent. The large amount of steam in the feed to the reformer serves to increase the mass of the reformate to assure that sufficient thermal energy is available to generate the sought amount of steam through cooling the reformate. The high temperature of the reforming effluent is effectively used not only to provide a substantial portion of the steam requirements but also to super heat to the steam-containing stream. In general, at higher steam to carbon ratios, it is preferred to generate a greater proportion of the steam by heat exchange with the reformate than at the lower ratios. This is especially true where a purified hydrogen product is obtained by membrane or pressure swing adsorption treatment and the purge or retentate gas is combusted to provide heat to feed to the reformer. Thus, the heat from the reformate is primarily used for the generation of steam and to a lesser extent for superheating the steam. Preferably, the amount of the steam generated by cooling the reformate does not exceed that which results in the steam-containing stream having a temperature of less than about 300° C., and preferably not less than about 400° C.

Aspects of this invention contemplate the use of two or more stages of heat exchange with the hot reformate. In those aspects, it is preferred to use a first stage which cools the reformate from the temperature it exits the reformer to within the range of 250° to 400° C., preferably 280° to 350° C. By first stage it is contemplated that one or more indirect heat exchangers may be used as a design convenience. In at least one subsequent stage, the reformate is cooled to a temperature within about 5° C. to 50° C. above the boiling point of water at the pressure of the reformate. Liquid water is introduced into the cold side of each of the stages. Often the first stage heat exchanger, the stage proximate to the reformer, receives from about 30 to 80 percent of the total liquid water introduced into the heat exchangers used to cool the reformate.

The reformate from the heat exchange sections will contain water and will typically be at a temperature of less than about 250° C., and often about 120° to 210° C., which is higher than desired for subsequent unit operations. Accordingly, the reformate is further cooled to a temperature below about 100° C., preferably to a temperature in the range of about 20° to 80 C., and most preferably to about 25° to 50° C., and the condensed water is recycled.

In the preferred aspects of the invention, the heat integrated steam cycle employs the unrecovered hydrogen from hydrogen purification processes such as membrane separations and pressure swing adsorptions. Additional steam can be provided by combusting waste gas from these operations. Often these waste gases contain up to about 30 volume percent hydrogen (dry basis), and thus the combustion gases have substantial heating values. For instance, the purge from the pressure swing adsorption system usually contains about 10 to 30, often 15 to 25, volume percent hydrogen (dry basis). Between the cooling of the reforming effluent and indirect heat exchange with the combustion gas, at least about 90, and preferably essentially all, the steam supplied to the partial oxidation reformer is generated. Advantageously, the temperature of the combustion gas may be below that which requires expense materials of construction, e.g., below about 800° C., and preferably below about 750° C.

Preferably the combustion gas is used first to heat via indirect heat exchange one or more of the feed streams to the partial oxidation reformer to temperatures of at least about 450° to 750° C., say, 500° C. or 550° to 650° C. or 700° C. The feed streams heated usually include at least a portion of a steam-containing stream in combination with either air or hydrocarbon-containing feedstock. The combustion gas after heating the one or more feed streams to the partial oxidation reformer will still contain significant heat values. Usually the combustion gas, after the heat exchange, will be at temperatures within the range of 200° to 500° C. and is used to generate additional steam.

The waste gas from the purification operation, i.e., retentate from a membrane separation or purge from a pressure swing adsorption, is combusted with an oxygen containing gas, usually air or, in the case of an integrated fuel cell, oxygen-containing waste gas from the fuel cell. The waste gas may be combined with additional fuel such as anode waste gas or hydrocarbon-containing feedstock. In the preferred embodiments, the gas for combustion is either the waste gas or the waste gas combined with anode waste gas from a fuel cell, especially where the hydrogen product from the hydrogen generator is used as a feed to the fuel cell.

Preferably the combustion of the waste gas is catalytic, e.g., using a platinum metal based combustion catalyst, to enhance stability of the combustion. The temperature of the combustion gas exiting the combustion zone is generally between about 500° and 800° or 1000° C., and preferably to avoid the need of expensive materials of construction, the temperature of combustion effluent is between about 600° and 750° C.

The combustion may be effected in the same vessel as an indirect heat exchange with a fluid intended to be fed to the partial oxidation reformer, or the combustion effluent may be passed to one or more physically separate heat exchangers. Preferably the combustion gas heats the steam or oxygen-containing feed or a combination of both. Higher temperatures of the heated gas are generally preferred to increase the amount of heat being carried to the reformer. Often the gas heated by the combustion gas is at a temperature in the range of about 450° to 750° C., say, 500° to 700° C. The combustion gas will still contain significant heat values. Usually the combustion gas, after this heat exchange, will be at temperatures within the range of 200° to 500° C. and can be used to generate steam to cycle to the partial oxidation reformer.

In one preferred embodiment, the combustion gas is used to heat in an indirect heat exchanger the oxygen-containing feed and at least a portion of the steam to be fed to the reformer. The cooler combustion gas is then used as the heat source for a boiler to generate a portion of the steam for the reforming, usually between about 10 to 60 percent of the steam. This steam may be combined with the oxygen-containing feed and, if desired, the remainder of the steam, and passed to the indirect heat exchanger having the hot combustion gas on the hot side.

The heat exchangers used to cool the reformats and to contact the combustion gas may be of any convenient design, including boilers if the cold side feed is essentially only water, and may comprise a unitary structure such as can be permitted with microchannel heat exchanger designs. The heat exchangers may be cocurrent, crosscurrent or counter current.

The apparatus may find attractive application in facilities that generate from about 1 to 1000, especially from about 10 to 200, kilograms of hydrogen per day.

Preferred aspects of the invention will be further described in connection with the drawings.

With reference to FIG. 1, hydrocarbon-containing feed for the hydrogen generator is supplied via line 102 at a rate controlled by valve 104. The feed is admixed with liquid water from line 106 supplied at a rate controlled by valve 108. This admixture further contains recycled water from line 110. The mixture is provided to heat exchanger 112, which is in counter current, indirect heat exchange with the effluent from water gas shift reactor 126.

In heat exchanger 112, at least a portion of the liquid water is vaporized as the effluent from the shift reactor is cooled. The heated fluid from heat exchanger 112 is passed via line 118 to heat exchanger 116 which is depicted as being in countercurrent, indirect heat exchange with effluent from autothermal reformer 122.

While the conditions of the heated fluid in line 118 may be such that liquid water remains, it is usually preferred to add liquid water between heat exchangers 112 and 116. This water is provided from line 106 and the flow rate of water is controlled by valve 114. If desired, liquid water may be introduced at one or more points in heat exchanger 116.

The fuel and vaporized water admixture from heat exchanger 116 is passed via line 120 to autothermal reformer 122 containing catalyst for partial oxidation and steam reforming. Into reformer 122 is also introduced a heated air stream via line 166.

The effluent from reformer 122 is passed via line 124 through heat exchanger 116 to water gas shift reactor 126. The cooling provided by heat exchanger 116 is sufficient to lower the temperature of the effluent to water gas shift temperatures, preferably to a temperature between about 280° and 350° C. where the equilibrium will favor a shift effluent containing less than 2 mole percent carbon monoxide (on a dry basis).

The temperature of the gases subjected to the water gas shift will increase as the reaction is slightly exothermic. The effluent from shift reactor 126 is passed through heat exchanger 112 to heat exchanger/condensor 130 where the temperature of the gases are reduced to those suitable for pressure swing adsorption. The condensed water can be recycled to heat exchanger 112 via line 110. Cooling water from line 132 is used to cool the shift effluent gases. Line 128 then directs the shift effluent gases to pressure swing adsorption system 134. A useful pressure swing adsorption system is depicted in connection with FIG. 4. As the pressure of the shift effluent is high, no additional compressor may be necessary to provide attractive feed pressures for the pressure swing adsorption.

Purified hydrogen is withdrawn from pressure swing adsorption system 134 via line 136. The purge from pressure swing adsorption system is passed via line 138 to combustor 140 as it contains hydrogen useful as fuel. Combustor 140 is preferably a catalytic combustor and is depicted as providing heat to air heater 156. In an advantageous aspect of this invention, the purge gas provides sufficient fuel value to heat the incoming air to a suitable temperature for introduction into reformer 122. As shown, air for combustion is provided via line 142 in an amount controlled by valve 144. If desired, one or more components may be added to the purge stream. Additional fuel may be added via line 146 at a flow rate controlled by valve 148. If the hydrogen is used in a fuel cell, cathode and/or anode waste gas may be added via line 150 at a rate controlled by valve 152. The combustion effluent exits via line 154.

Combustor 140 is in indirect heat exchange with air heater 156. Air is introduced via line 158 at a rate controlled by valve 160 into heater 156. If desired, liquid water from line 162 can be added to line 158 at a flow rate controlled by valve 164. The water may be added in an amount to provide air exiting heater 156 at a desired temperature for use in the reformer. It may also be another source of water to maintain the desired steam to carbon content in reformer 122. The heated air exits via line 166 and is directed to the inlet of reformer 122.

Figure 2:
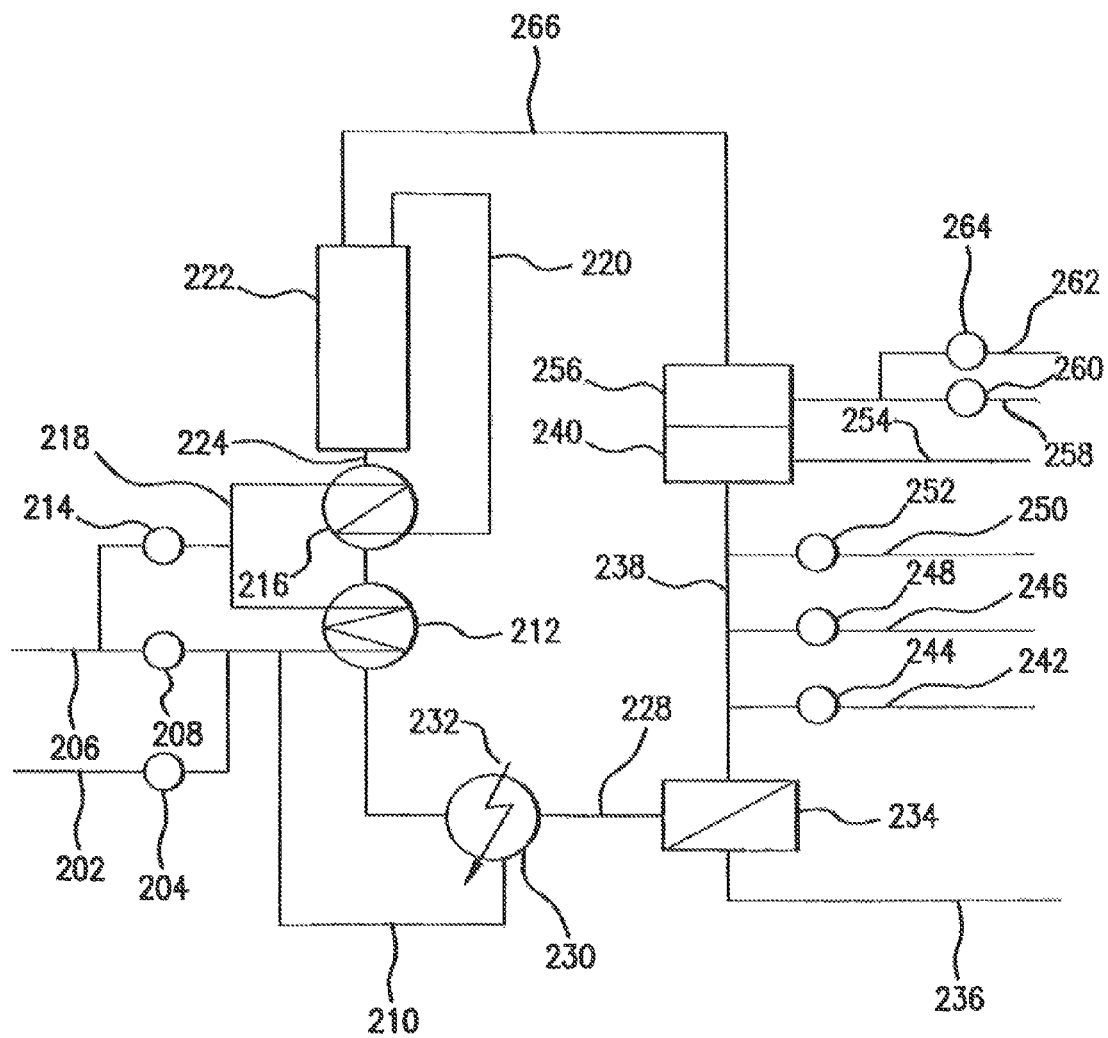
FIG. 2 is a schematic flow diagram of a process in accordance with this invention in which the partial oxidation reformer effluent is cooled in two heat exchanger stages and is purified through a selective permeation membrane without the use of a separate water gas shift reactor.

With reference to FIG. 2, hydrocarbon-containing feed for the hydrogen generator is supplied via line 202 at a rate controlled by valve 204. The hydrocarbon-containing feed is admixed with liquid water from line 206 supplied at a rate controlled by valve 208. This admixture further contains recycled water from line 210. The mixture is provided to heat exchanger 212 which is in counter current, indirect heat exchange with the effluent from autothermal reformer 222.

In heat exchanger 212, at least a portion of the liquid water is vaporized as reformate is cooled. The heated fluid from heat exchanger 212 is passed via line 218 to heat exchanger 216 which is depicted as being in cocurrent, indirect heat exchange with effluent from autothermal reformer 122.

While the conditions of the heated fluid in line 218 may be such that liquid water remains, it is usually preferred to add liquid water between heat exchangers 212 and 216. This water is provided from line 206 and the flow rate of water is controlled by valve 214. If desired, liquid water may be introduced at one or more points in heat exchanger 216.

The fuel and vaporized water admixture from heat exchanger 216 is passed via line 220 to autothermal reformer 222 containing catalyst for partial oxidation and steam reforming. Into reformer 222 is also introduced a heated air stream via line 266.

The effluent from reformer 222 is passed via line 224 though heat exchanger 216 and then through heat exchanger 212 to heat exchanger/condenser 230 where the temperature of the gases are reduced to those suitable for hydrogen purification. The condensed water can be recycled to heat exchanger 212 via line 210. Cooling water from line 232 is used to cool the effluent gases. Line 228 then directs the effluent gases to membrane separator 234. As the pressure of the effluent is high, no additional compressor may be necessary to provide attractive feed pressures for the membrane separation.

Purified hydrogen is withdrawn from membrane separator 234 via line 236. The high-pressure retentate from membrane separator 234 is passed via line 238 to combustor 240 as it contains unrecovered hydrogen useful as fuel. If desired, the high-pressure retentate can be passed to an expander/turbine (not shown) to recover power. Combustor 240 is preferably a catalytic combustor and is depicted as providing heat to air heater 256. In an advantageous aspect of this invention, the retentate provides sufficient fuel value to heat the incoming air to a suitable temperature for introduction into reformer 222. As shown, air for combustion is provided via line 242 in an amount controlled by valve 244. However, if desired, one or more components may be added to the purge stream. Additional fuel may be added via line 246 at a flow rate controlled by valve 248. If the hydrogen is used in a fuel cell, cathode and/or anode waste gas may be added via line 250 at a rate controlled by valve 252. The combustion effluent exits via line 254.

Combustor 240 is in indirect heat exchange with air heater 256. Air is introduced via line 258 at a rate controlled by valve 260 into heater 256. If desired, liquid water from line 262 can be added to line 258 at a flow rate controlled by valve 264. The water may be added in an amount to provide air exiting heater 256 at a desired temperature for use in the reformer. It may also be another source of water to maintain the desired steam to carbon content in reformer 222. The heated air exits via line 266 and is directed to the inlet of reformer 222.

Figure 3:
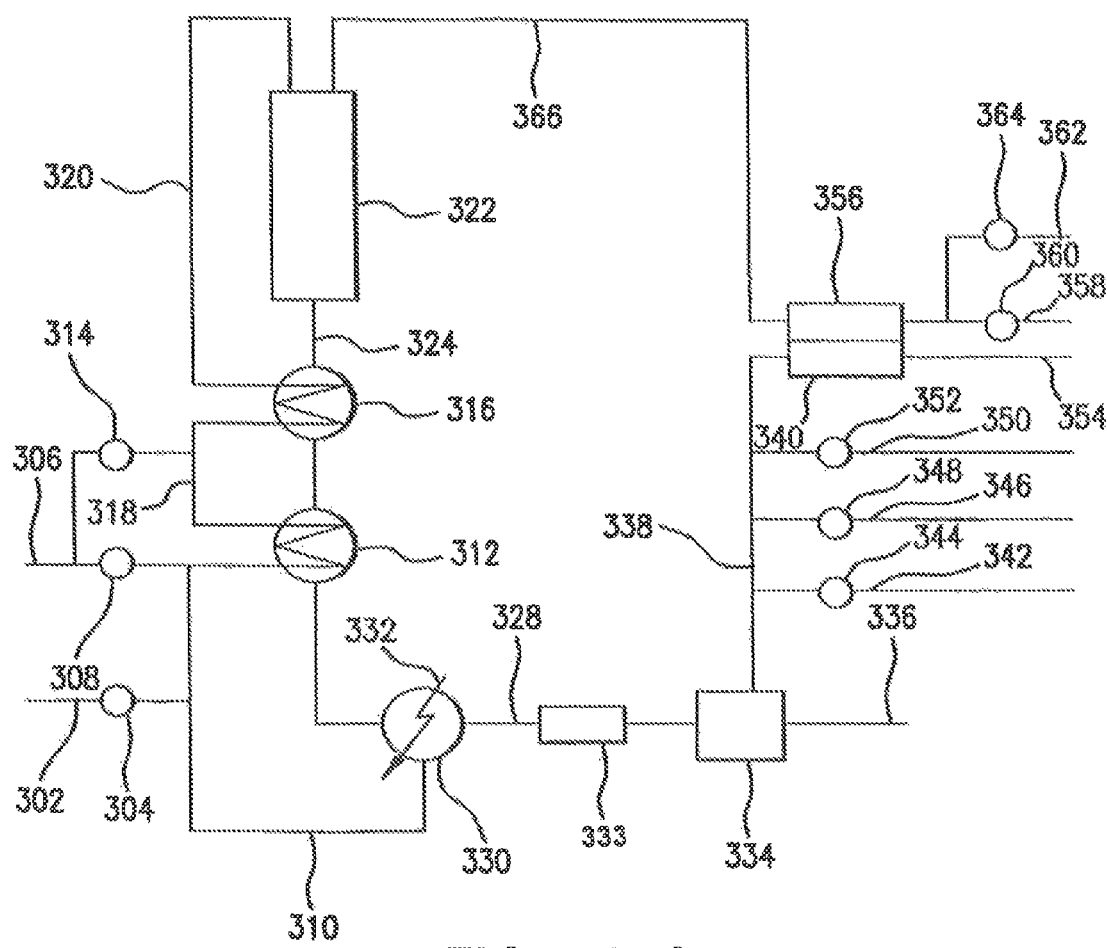
FIG. 3 is a schematic flow diagram of a process in accordance with the invention in which the reformer effluent is cooled without having been subjected to water gas shift, subjected to sorption to remove hydrogen sulfide and then purified through pressure swing adsorption.

With reference to FIG. 3, hydrocarbon-containing feed for the hydrogen generator is supplied via line 302 at a rate controlled by valve 304. In this embodiment, the feed also contains sulfur components, e.g., such as would be contained as odorants in natural gas. These sulfur components can include organosulfides, mercaptans, carbonyl sulfide and the like. The hydrocarbon-containing feed is admixed with liquid water from line 306 supplied at a rate controlled by valve 308. This admixture further contains recycled water from line 310. The mixture is provided to heat exchanger 312 which is in counter current, indirect heat exchange with the effluent from autothermal reformer 322.

In heat exchanger 312, at least a portion of the liquid water is vaporized as reformate is cooled. The heated fluid from heat exchanger 312 is passed via line 318 to heat exchanger 316 which is depicted as being in countercurrent, indirect heat exchange with effluent from autothermal reformer 322.

While the conditions of the heated fluid in line 318 may be such that liquid water remains, it is usually preferred to add liquid water between heat exchangers 312 and 316. This water is provided from line 306 and the flow rate of water is controlled by valve 314. If desired, liquid water may be introduced at one or more points in heat exchanger 316.

The fuel and vaporized water admixture from heat exchanger 316 is passed via line 320 to autothermal reformer 322 containing catalyst for partial oxidation and steam reforming. Into reformer 322 is also introduced a heated air stream via line 366.

The effluent from reformer 322 is passed via line 324 through heat exchanger 316 and then through heat exchanger 312 to heat exchanger/condensor 330 where the temperature of the gases are reduced to those suitable for hydrogen purification. The condensed water can be recycled to heat exchanger 312 via line 310. Cooling water from line 332 is used to cool the reformer effluent gases. Line 328 then directs the cooled gases to hydrogen sulfide sorber 333 and then to pressure swing adsorption system 334.

The sulfur components contained in the feed are substantially converted to hydrogen sulfide in the autothermal reformer 322. Since in this embodiment of the invention, no water gas shift stage is used and sulfur-tolerant catalysts for the autothermal reforming are available, the complexities of removing sulfur can be avoided. Hydrogen sulfide can readily be removed from gas streams by sorption, especially chemisorption. Moreover, since sulfur components in feeds such as natural gas are in very small quantities, a relatively small bed of sorbent is usually sufficient.

Hydrogen sulfide sorber 333 contains a suitable sorbent for hydrogen sulfide such as zinc oxide. As depicted, the hydrogen sulfide sorption is downstream of heat exchanger/condenser 330. In some instances it may be preferred to remove hydrogen sulfide from the reformate while it is at higher temperatures, e.g., up to about 250° C., which enhances the rate of chemisorption on sorbents such as zinc oxide. In such case, the hydrogen sulfide sorber may be upstream of the heat exchanger/condenser. Alternatively, the hydrogen sulfide adsorber may be placed in line 338.

As the pressure of the reformer effluent is high, no additional compressor may be necessary to provide attractive feed pressures for the pressure swing sorption system. Purified hydrogen is withdrawn from pressure swing adsorption system 334 via line 336. The purge from pressure swing adsorption system is passed via line 338 to combustor 340 as it contains hydrogen useful as fuel. Combustor 340 is preferably a catalytic combustor and is depicted as providing heat to air heater 356. In an advantageous aspect of this invention, the purge gas from the pressure swing adsorption system provides sufficient fuel value to heat the incoming air to a suitable temperature for introduction into reformer 322. As shown, air for combustion is provided via line 342 in an amount controlled by valve 344. However, if desired, one or more components may be added to the purge stream. Additional fuel may be added via line 346 at a flow rate controlled by valve 348. If the hydrogen is used in a fuel cell, cathode and/or anode waste gas may be added via line 350 at a rate controlled by valve 352. The combustion effluent exits via line 354.

Combustor 340 is in indirect heat exchange with air heater 356. Air is introduced via line 358 at a rate controlled by valve 360 into heater 356. If desired, liquid water from line 362 can be added to line 358 at a flow rate controlled by valve 364. The water may be added in an amount to provide air exiting heater 356 at a desired temperature for use in the reformer. It may also be another source of water to maintain the desired steam to carbon ratio in reformer 322. The heated air exits via line 366 and is directed to the inlet of reformer 322.

Figure 4:
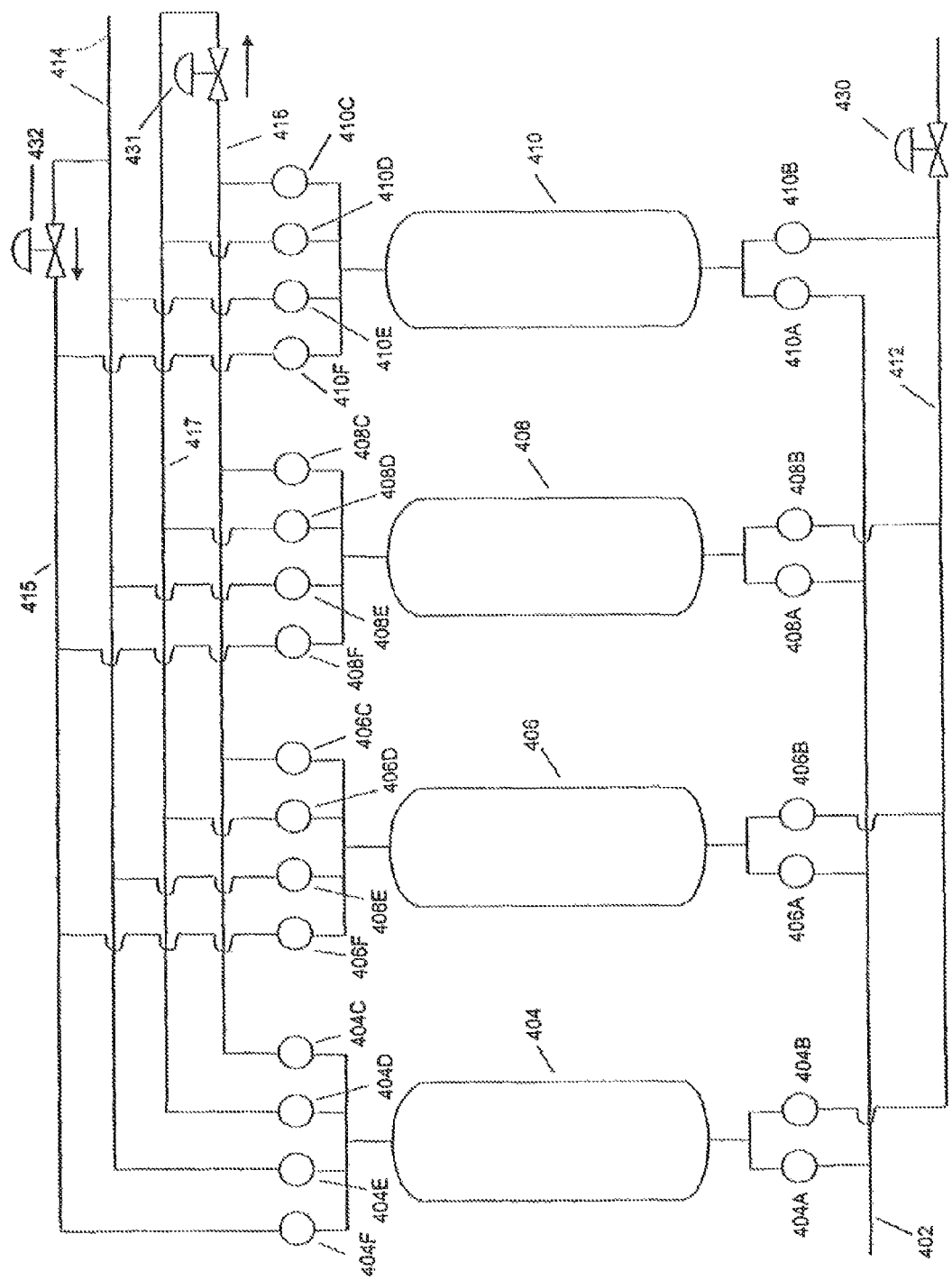
FIG. 4 is a schematic flow diagram of a pressure swing adsorption system useful in the processes of this invention.

FIG. 4 depicts a four bed pressure swing adsorber useful for purifying hydrogen produced by autothermal reforming with air. A feed containing hydrogen, nitrogen, argon, water, carbon dioxide, carbon monoxide and any unreacted hydrocarbon containing feedstock is passed via line 402 to one of vessels 404, 406, 408 and 410 which is in the adsorption phase of the cycle. Each of the vessels has a valve, 404A, 406A, 408A and 410A, respectively, to permit flow of the feed to the vessel at one end. Each of the vessels at the same end is in fluid communication with a purge header 412 through valves 404B, 406B, 408E and 410B. Each of the vessels is in fluid communication at the opposing end with purified product header 414 through valves 404E, 406E, 408E and 410E. Also on said opposing end, each vessel is in fluid communication with pressurization header 415 through valves 404F, 406F, 408F, and 410F. Further on said opposing end, each vessel is in fluid communication with provide equalization/provide purge header 416 through valves 404C, 406C, 408C, and 410C. Finally on said opposing end, each vessel is in fluid communication with receive equalization/receive purge header 417 through valves 404D, 406D, 408D, and 410D.

A proportional control valve 431 is provided on the purge/equalization header in order to control the rate of pressure change in the beds during provide purge and provide equalization steps. An additional proportional control valve 432 is provided on the pressurization header in order to control the rate of pressurization. A further control valve 430 is provided on the tail gas line 412 in order to control the rate of blowdown.

Each of the vessels is filled with adsorbent, e.g., a granular activated carbon adsorbent for about 30 volume percent of the bed closest to the feed inlet and the remainder being a beaded lithium exchanged X molecular sieve.

For the bed undergoing adsorption, its valves A and E are open and purified hydrogen product stream enters header 414. Once a bed goes off the adsorption step of the cycle valves A and E are closed and the C valve is opened. The gases, which primarily are those in the interstitial spaces in the vessel, are passed into header 416 and are introduced into the vessel undergoing represurization through the D valve. Once the two vessels are at substantially the same pressure, the gases are passed to the vessel being purged. The purging is done at low pressure, e.g., less than about 50 kPa above ambient atmospheric pressure. After the purge step is completed, the B valve is closed at the bottom of the bed undergoing purge and the two beds equalize in pressure (second equalization). Following the second equalization, the C valve is closed and the B valve is opened and the pressure within the vessel is dropped to the low pressure for purging. Once this blow down is completed, the D valve is opened such that the gas from the vessel in the provide purge step of the cycle can purge the bed. In the next step, the B valve is closed and the bed is partially repressurized by equalizing pressure with another bed through the D valve. In the final step, the bed is further repressurized through the D valve by equalizing with another bed undergoing the first equalization step. Valve D is then closed after the pressure equalization is completed, and the purified hydrogen product stream continues to fill the vessel through the F valve until substantially the pressure for adsorption is reached. Valves A and E are then opened to restart the adsorption step.

Advantageously, the pressure swing adsorption unit in FIG. 4 is designed to use only two proportional control valves thereby simplifying automation, reducing the tuning requirements in the field, and improving operability.

Figure 5:
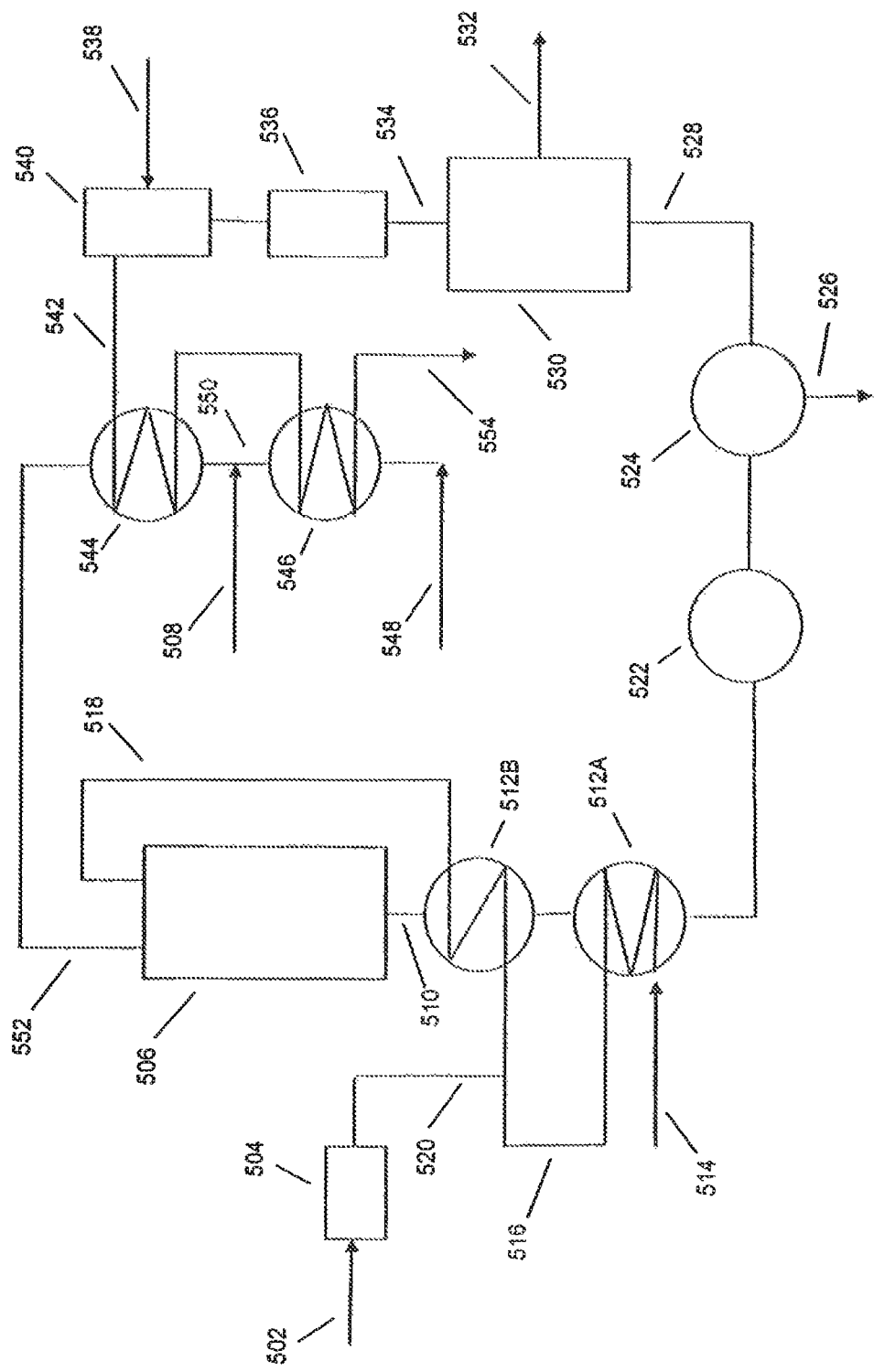
FIG. 5 is a schematic flow diagram of a process in accordance with the invention in which the reformer effluent is cooled in a steam boiler and then purified through pressure swing adsorption.

With respect to FIG. 5, hydrocarbon-containing feed is supplied by line 502 to a hydrogen generator. As depicted, the feed is passed through desulfurizer 504 which is a solid adsorbent bed desulfurizer to remove organosulfur compounds. Thereafter, the hydrocarbon-containing feed is passed via line 520 to be combined with steam and heated in indirect heat exchanger 512B prior to being passed to autothermal reformer 506. Air for the autothermal reforming is supplied by line 508 and is combined with steam in line 550, passed through indirect heat exchanger 544 and then via line 552 to reformer 506.

The reformate from autothermal reformer 506 exits via line 510 and is cooled in indirect heat exchanger 512B and boiler 512A. Heat exchanger 512B and boiler 512A may be in separate or the same vessel. Liquid water is supplied to boiler 512A by line 514, and is vaporized with the steam exiting boiler 512A via line 516 being directed to indirect heat exchanger 512B. The steam in line 516 is admixed with hydrocarbon containing feed from line 520. The steam and hydrocarbon-containing feed mixture, after being heated in indirect heat exchanger 512B are passed to reformer 506 via line 518.

The cooled reformate exits boiler 512A and is directed to air cooler 522 and to knock out pot 524. Condensed water is withdrawn via line 526 and is preferably recycled as water feed to the reformer. The gas phase from knock out pot 524 passes via line 528 to pressure swing adsorption system 530. A hydrogen product stream is withdrawn from the pressure swing adsorption system via line 532 and a purge stream from the system is withdrawn via line 534. Line 534 first directs the purge through a hydrogen sulfide sorption bed 536 and then to combustor 540. Air is supplied to combustor 540 via line 538.

In combustor 540, the hydrogen, carbon monoxide and unreacted hydrocarbon-containing feed in the purge are combusted to provide a combustion gas. Typically, this combustion is catalytic or employs a flame holder to enhance stability of the combustion. It is readily apparent that combustor 540 and heat exchanger 544 could be a single unit.

The combustion gas is then passed via line 542 to the hot side of heat exchanger 544. The cooled combustion gas still has substantial heat content and is passed from heat exchanger 544 to boiler 546. Liquid water is passed via line 548 to boiler 546 and the generated steam is withdrawn via line 550 and combined with air from line 508 for passage to the cool side of heat exchanger 544. The cooled combustion gas is exhausted from boiler 546 via line 554.

Figure 6:
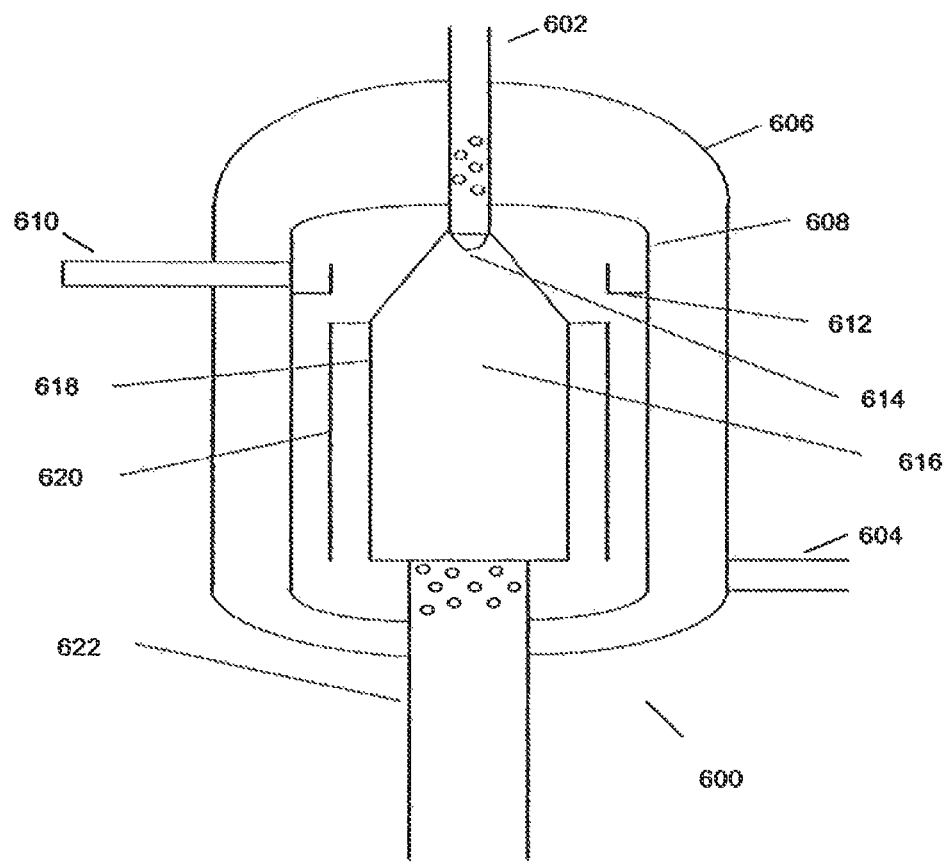
FIG. 6 is a schematic diagram of a hybrid flame and catalytic oxidation combustor useful in the processes of this invention.

FIG. 6 is a schematic representation of a hybrid combustor which can be used in the process depicted in FIG. 5. Combustor 600 is provided with sorption purge inlet conduit 602. Primary air supply conduit 604 supplies air for the combustion. The primary air enters combustor between outer shell 606 and inner shell 608, which surrounds, the combustion zone. Thus, the air is preheated before being mixed with the sorption purge gas. The mixing occurs by air passing through perforations in the sorption purge inlet conduit.

This mixture is passed from conduit 602 into plenum 616. Distributor 614 is provided at the end of conduit 602 to facilitate uniform mixing of the sorption purge gas and primary air. Distributor 614 may be a baffle. Plenum 616 has a gas-permeable, cylindrical side wall 618 composed of oxidation catalyst. For purposes of illustration only, the wall is a wire mesh having openings in the range of about 0.01 to 2, preferably, 0.05 to 1, millimeter in major dimension. Preferably, the pressure drop through the catalyst is less than about 20, preferably less than about 5, and most preferably less than about 2, kPa. Usually, the first 0.1 to 1 centimeter of the top of the cylindrical side wall is gas impermeable. The oxidation catalyst supports sufficient catalytic combustion that stable flame combustion can occur. From time to time, the fuel and air mixture inside the plenum may not be at conditions sufficient to support flame combustion. Hence, the combustion occurs proximate to the oxidation catalyst. The portion of the combustion that is catalytic will vary with the throughput.

Plenum 616 also has gas impermeable frustoconical top in a sealing relationship with conduit 602 and the cylindrical side wall. The bottom of plenum 616 is also sealed with a gas impermeable base, which abuts the bottom of the cylindrical side wall. The hot combustion gas and flame exit radially from the cylindrical side wall into a combustion zone defined by a concentric baffle 620. Concentric baffle 620 is in a fluid sealed relationship with plenum 616 above the portion of the cylindrical side wall that is active for the combustion. The lower portion of baffle 620 is open to combustion gas flow from the combustion zone.

Secondary air is provided via secondary air conduit 610 which enters the zone between plenum 616 and inner shell 608. Baffle 612 is provided proximate to the inlet from conduit 610 to assist in distributing the secondary air around plenum 616. As shown, the secondary air passes on the outside of concentric baffle 620 and is heated while cooling the combustion gas. Then, the secondary air is combined with the gas passing from the combustion zone defined by the cylindrical side wall and concentric baffle 620. The combined gas, the combustion gas, is withdrawn via line 622.

In operation, where the sorption purge gas has little heating value and a relatively low flame temperature, little, if any, secondary air will be required to achieve the sought temperature for the combustion gas. In some instances, it may be desired to heat the primary air such that desirable flame temperatures are obtained. With little or no secondary air introduction, the temperature outside concentric baffle 620 will approximate that of the combustion zone and indirect heat transfer will occur with the primary air. However, with higher secondary air flow rates, the heat from the combustion zone will primarily be absorbed by the secondary air with a lesser increase in temperature of the primary air.

Table 1 sets forth computer simulation data including those used in the preparation of FIGS. 9A, 9B and 9C, respectively.

TABLE 1

| ATR Temp deg C. | Pressure psig | S/C ratio | ATR CO mole frac | ATR H2 mole frac | O2/C ratio | H2/Feed ratio | Feed Nm3/hr | Hydrogen Nm3/hr |
|---|---|---|---|---|---|---|---|---|
| 650 | 60 | 4 | 0.0477 | 0.4855 | 0.40 | 1.79 | 54.0 | 96.6 |
| 650 | 100 | 4 | 0.0422 | 0.4611 | 0.40 | 1.62 | 54.0 | 87.4 |
| 650 | 140 | 4 | 0.0381 | 0.4410 | 0.40 | 1.49 | 54.0 | 80.5 |
| 650 | 60 | 6 | 0.0379 | 0.5155 | 0.40 | 1.99 | 54.0 | 107.8 |
| 650 | 100 | 6 | 0.0349 | 0.4992 | 0.40 | 1.87 | 54.0 | 100.8 |
| 650 | 140 | 6 | 0.0324 | 0.4839 | 0.40 | 1.75 | 54.0 | 94.7 |
| 650 | 60 | 8 | 0.0309 | 0.5299 | 0.40 | 2.10 | 54.0 | 113.3 |
| 650 | 100 | 8 | 0.0294 | 0.5197 | 0.40 | 2.01 | 54.0 | 108.7 |
| 650 | 140 | 8 | 0.0278 | 0.5090 | 0.40 | 1.93 | 54.0 | 104.0 |
| 700 | 60 | 4 | 0.0634 | 0.5082 | 0.40 | 1.99 | 54.0 | 107.6 |
| 700 | 100 | 4 | 0.0593 | 0.4941 | 0.40 | 1.88 | 54.0 | 101.6 |
| 700 | 140 | 4 | 0.0556 | 0.4804 | 0.40 | 1.78 | 54.0 | 96.1 |
| 700 | 60 | 6 | 0.0482 | 0.5261 | 0.40 | 2.11 | 54.0 | 114.0 |
| 700 | 100 | 6 | 0.0466 | 0.5190 | 0.40 | 2.05 | 54.0 | 110.8 |
| 700 | 140 | 6 | 0.0449 | 0.5109 | 0.40 | 1.98 | 54.0 | 107.2 |
| 700 | 60 | 8 | 0.0385 | 0.5343 | 0.40 | 2.16 | 54.0 | 116.6 |
| 700 | 100 | 8 | 0.0378 | 0.5306 | 0.40 | 2.13 | 54.0 | 114.9 |
| 700 | 140 | 8 | 0.0370 | 0.5260 | 0.40 | 2.09 | 54.0 | 112.8 |
| 750 | 60 | 4 | 0.0753 | 0.5151 | 0.40 | 2.08 | 54.0 | 112.2 |
| 750 | 100 | 4 | 0.0734 | 0.5092 | 0.40 | 2.03 | 54.0 | 109.6 |
| 750 | 140 | 4 | 0.0711 | 0.5022 | 0.40 | 1.97 | 54.0 | 106.5 |
| 750 | 60 | 6 | 0.0568 | 0.5272 | 0.40 | 2.15 | 54.0 | 116.0 |
| 750 | 100 | 6 | 0.0562 | 0.5246 | 0.40 | 2.13 | 54.0 | 114.9 |
| 750 | 140 | 6 | 0.0554 | 0.5214 | 0.40 | 2.10 | 54.0 | 113.4 |
| 750 | 60 | 8 | 0.0455 | 0.5334 | 0.40 | 2.18 | 54.0 | 117.6 |
| 750 | 100 | 8 | 0.0452 | 0.5322 | 0.40 | 2.17 | 54.0 | 117.0 |
| 750 | 140 | 8 | 0.0449 | 0.5306 | 0.40 | 2.15 | 54.0 | 116.2 |

Table 2 sets forth data from computer simulations on a hydrogen generator of the type set forth in FIG. 5 (except that the hydrocarbon-containing feed in line 502 is introduced directly to autothermal reformer 506 without preheating) which data were used in the preparation of FIG. 10.

TABLE 2

| P (kPa) | Total S:C | % S:C To ATR Boiler | NHE |
|---|---|---|---|
| 300 | 3.0 | 50 | 55.4 |
| 300 | 4.0 | 50 | 58.1 |
| 300 | 4.5 | 50 | 59.0 |
| 300 | 5.0 | 50 | 58.9 |
| 300 | 6.0 | 67 | 55.7 |
| 600 | 3.0 | 50 | 50.4 |
| 600 | 4.0 | 50 | 54.6 |
| 600 | 5.0 | 50 | 57.3 |
| 600 | 5.5 | 55 | 56.3 |
| 600 | 6.0 | 67 | 54.0 |
| 1200 | 3.5 | 43 | 45.7 |
| 1200 | 4.5 | 50 | 50.2 |
| 1200 | 5.5 | 50 | 53.4 |
| 1200 | 6.0 | 50 | 51.3 |
| 1200 | 6.5 | 60 | 48.8 |

Table 3 provides the conditions for the operation of the hydrogen generator used in this simulation. This simulation is based on natural gas feed, and produces a reformate (at the maximum NHE point) containing approximately: 43 mol % hydrogen, 38 mol % nitrogen, 13 mol % carbon dioxide, 3.5 mol % carbon monoxide, and 1.5 mol % methane. The reformer effluent temperature is 675° C. In all cases, 75 percent of the hydrogen is recovered as purified hydrogen product and contains less than 5 parts per million by volume carbon monoxide. The steam to carbon ratio is the sum of the S/C for each of heat exchangers 544 and 546 (combustion gas heat exchange) and 512 (reformate heat exchange) in Table 3. The Net Hydrogen Efficiency will be higher if a water gas shift is used.

TABLE 3

| | Heat Exchanger 544 & 546 | | | Heat Exchanger 512 | | |
|---|---|---|---|---|---|---|
| Pressure kPa, absolute | S/C | Heated Feed Temp., ° C. | Cooled Combustion Gas Temp., ° C. | S/C | Heated Feed Temp., ° C. | Cooled Reformate Temp., ° C. |
| 300 | 1.5 | 600 | 361 | 1.5 | 600 | 317 |
| 300 | 2.0 | 500 | 255 | 2.0 | 600 | 253 |
| 300 | 2.25 | 600 | 197 | 2.25 | 600 | 230 |
| 300 | 2.5 | 540 | 154 | 2.5 | 600 | 212 |
| 300 | 2.0 | 540 | 154 | 4.0 | 270 | 154 |
| 600 | 1.5 | 600 | 406 | 1.5 | 600 | 305 |
| 600 | 2.0 | 600 | 299 | 2.0 | 600 | 249 |
| 600 | 2.5 | 600 | 184 | 2.5 | 600 | 203 |
| 600 | 2.5 | 480 | 177 | 3.0 | 530 | 175 |
| 600 | 2.0 | 520 | 171 | 4.0 | 230 | 174 |
| 1200 | 2.0 | 600 | 383 | 1.5 | 600 | 325 |
| 1200 | 2.25 | 600 | 311 | 2.25 | 600 | 217 |
| 1200 | 2.75 | 600 | 195 | 2.75 | 550 | 198 |
| 1200 | 2.7 | 470 | 198 | 3.0 | 510 | 196 |
| 1200 | 3.0 | 275 | 197 | 3.0 | 600 | 196 |
| 1200 | 2.6 | 235 | 199 | 3.9 | 320 | 198 |

It is claimed:

1. An efficient, integrated process for generating hydrogen from a hydrocarbon-containing feedstock in the essential absence of a shift reaction zone comprising:
   a. passing to a partial oxidation reformer at a pressure of between about 400 and 1500 kPa absolute feed comprising hydrocarbon-containing feedstock, air, and steam wherein the molar ratio of steam to carbon in the hydrocarbon-containing feedstock is at least about 4:1, said reformer being at partial oxidation/steam reforming conditions to provide a reforming effluent stream comprising at least about 40 volume percent (dry basis) hydrogen, nitrogen, steam, carbon monoxide and carbon dioxide;
   b. cooling the reforming effluent stream by indirect heat exchange with a stream containing liquid water to provide a steam-containing stream which is cycled to the partial oxidation/steam reforming zone wherein at least about 40 percent of the steam in the feed mixture is produced by said indirect heat exchange;

c. further cooling the cooled reforming effluent stream to pressure swing adsorption conditions, said cooling being sufficient to condense water;

d. during or after the further cooling separating the condensed water;

e. subjecting the further cooled reforming effluent stream to pressure swing adsorption such that a purified hydrogen stream is produced which (i) is at least about 98 mole percent hydrogen, and (ii) contains less than about 10 ppmv carbon monoxide, and a sorption purge gas is produced at a pressure between about 5 and 100 kPa gauge which comprises less than about 30 volume percent hydrogen (dry basis) and nitrogen, carbon dioxide and carbon monoxide;

f. withdrawing at least a portion of the purified hydrogen stream as hydrogen product;

g. combusting in the substantial absence of added fuel, the sorption purge gas with an oxygen-containing gas in the presence of an oxidation catalyst to provide a combustion gas having a temperature of less than about 800° C.;

h. subjecting the combustion gas to at least one indirect heat exchange with a liquid water-containing stream to generate steam which is cycled to the reformer; and i. exhausting the cooled combustion gas, wherein the Net Hydrogen Efficiency is at least about 50 percent.

2. The process of claim 1 wherein in step (g) at least two indirect heat exchanges occur wherein the combustion gas is in a first heat exchange with steam and the oxygen-containing stream and in a subsequent heat exchange, the combustion gas is used to vaporize water for steam which is used as a feed to the partial oxidation reformer.

3. The process of claim 1 wherein the pressure swing absorption comprises four absorbent beds and two pressure equalizations.

4. The process of claim 1 wherein the purified hydrogen product comprises at least about 99.9 volume percent hydrogen.

5. The process of claim 1 wherein the pressure drop through the oxidation catalyst of step (g) is less than 5 KPa.

* * * * *